G. G. LARKIN.
Carriage Shackle.
No. 82,420.
Patented Sept. 22, 1868.
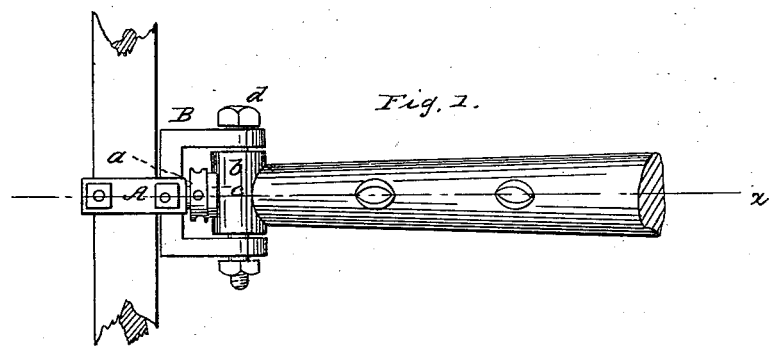
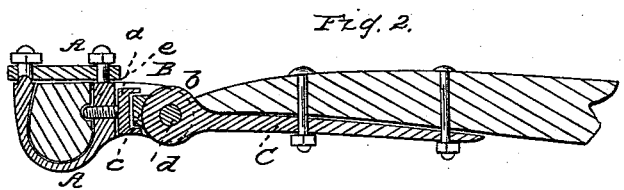

UNITED STATES PATENT OFFICE.

GEORGE G. LARKIN, OF WEST AMESBURY, MASSACHUSETTS.

IMPROVED CARRIAGE-SHACKLE.

Specification forming part of Letters Patent No. 82,420, dated September 22, 1868.

*To all whom it may concern:*

Be it known that I, GEORGE G. LARKIN, of West Amesbury, in the county of Essex and State of Massachusetts, have invented a new and useful Improvement in Carriage-Shackles; and I do hereby declare that the following is a full, clear, and exact description thereof, which will enable others skilled in the art to make and use the same, reference being had to the accompanying drawings, forming part of this specification, in which—

Figure 1 is a top view of my improved shackle. Fig. 2 is a longitudinal section of the same through the line $x\,x$ of Fig. 1.

Similar letters of reference indicate like parts.

The object of this invention is to prevent the rattling, and consequent increased wear, of the shackles of a carriage shaft or tongue.

It consists of cushioned disks, which are made to impinge against the rear of the eye of the shaft-iron, and thereby keep it pressed firmly against the shackle-bolt.

In the accompanying plate of drawings, the clip shown at A is of the ordinary construction, as is also the shackle B, with its bolt $d$ passing through the eye $b$ of the shaft or tongue iron C, as shown. The disk $a$ is formed with a screw-shank, $e$, which works in a hollow thread cut in the clip, as shown. The front face of the disk is recessed or formed with a cavity for the reception of a leather pad, $c$, as shown. The disk is provided with radial holes or sockets, as shown at Fig. 1, for the purpose of inserting a rod, where the disk is to be adjusted against the eye with more or less pressure.

The disk, in practice, would be cast on the screw-shank $e$, which is of wrought or malleable iron; or the shank and disk may be formed wholly of malleable iron. This disk can be applied to the carriage-shackles of the same pattern now in use, and will accomplish a considerable saving in the wear of the same, besides preventing any disagreeable clattering of the eye and shackle-bolt.

Having thus explained my invention, I claim as new and desire to secure by Letters Patent—

The disk $a$, provided with radial sockets, and carrying the pad C, when formed with a screw-threaded shank, $e$, adjustable in the front side of the clip A, as herein described, for the purpose specified.

The above specification of my invention signed by me this 21st day of February, 1868.

GEORGE G. LARKIN.

Witnesses:
 OTIS SARGENT,
 JOSHUA COLBY.